(12) United States Patent
Ferrante

(10) Patent No.: US 6,494,606 B1
(45) Date of Patent: Dec. 17, 2002

(54) COLOR CORRECTION FOR FIBER OPTIC ILLUMINATION SYSTEMS

(75) Inventor: Ronald A. Ferrante, Castaic, CA (US)

(73) Assignee: Wavien, Inc., Santa Clarita, CA (US)

( * ) Notice: Subject to any disclaimer, the term of this patent is extended or adjusted under 35 U.S.C. 154(b) by 0 days.

(21) Appl. No.: 09/466,136

(22) Filed: Dec. 21, 1999

(51) Int. Cl.[7] .............................. F21V 21/30; F21S 4/00
(52) U.S. Cl. ...................... 362/583; 362/263; 362/558; 313/112
(58) Field of Search .................. 362/263, 554, 362/556, 583, 558, 293; 313/580, 110, 112

(56) References Cited

U.S. PATENT DOCUMENTS

| | | | | |
|---|---|---|---|---|
| 4,528,478 A | * | 7/1985 | Rothwell, Jr. et al. | 313/631 |
| 5,003,434 A | * | 3/1991 | Gonser et al. | 362/293 |
| 5,059,146 A | * | 10/1991 | Thomas et al. | 445/4 |
| 5,838,865 A | * | 11/1998 | P. Gulick | 385/121 |
| 5,887,965 A | * | 3/1999 | Edens et al. | 362/554 |
| 5,993,037 A | * | 11/1999 | Tomioka et al. | 362/583 |
| 6,089,741 A | * | 7/2000 | Chen et al. | 362/583 |
| 6,099,146 A | * | 8/2000 | Imamura et al. | 362/293 |

FOREIGN PATENT DOCUMENTS

| | | |
|---|---|---|
| WO | WO 98/32041 A1 | 7/1998 |
| WO | WO 00/77446 A2 | 12/2000 |

* cited by examiner

Primary Examiner—Sandra O'Shea
Assistant Examiner—Ali Alavi
(74) Attorney, Agent, or Firm—Rothwell, Figg, Ernst & Manbeck

(57) ABSTRACT

A fiber optic illumination system with the output spectrum of the arc lamp modified using filters to reduce the magnitude of the spikes in the spectrum such that the resulting output has the desired chromaticity and color rendering index of white light.

27 Claims, 13 Drawing Sheets

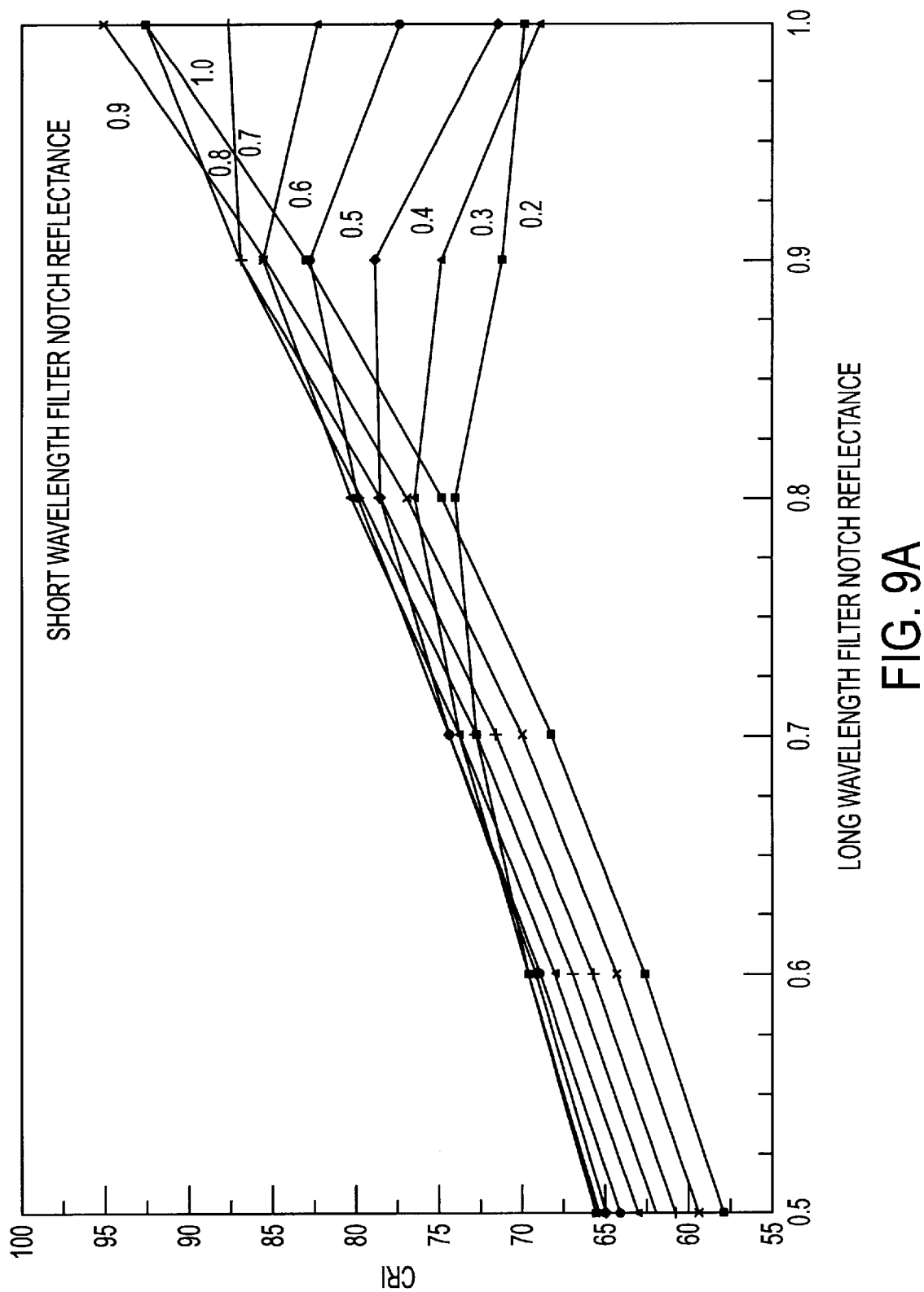

COLOR CORRECTION FOR FIBER OPTIC ILLUMINATION SYSTEMS

FIELD OF THE INVENTION

The present invention relates to a fiber optic illumination system generally used during medical procedures.

BACKGROUND OF THE INVENTION

During surgery, illumination is provided to clarify the doctor's view. It is important for the illumination to have a sufficient light energy at the correct color temperature and color rendering index value. The illumination is typically provided by a lamp situated inside the illuminator with light directed to the surgical site by the use of a fiber bundle.

Halogen lamps have been used in the past for such illuminator systems. They are low cost, but the amount of light is usually less than desired and the color temperature is usually low. Higher end systems using xenon arc lamp provide a more desirable color temperature, which is almost the same as sunlight, and sufficient amount of light. The drawback is that these systems tend to be expensive due to the low intrinsic efficiency of the lamp and the required complex and expensive ballast. Metal halide and mercury lamps are also used for such purposes due to the higher efficiency of the lamps compared to xenon lamps, about 2 to 3 times more efficient, and as a result, provide a lower cost illuminator.

Due to the use of the metal halide and/or mercury inside discharge bulb, the output spectrum contains sharp spectral spikes, which correspond to the characteristics of the materials used. The effect of these spikes changes the characteristics of the output in terms of the color temperature, chromaticity and color rendering index. While filters have been used in metal halide lamp systems to correct the color temperature of the output, the chromaticity and color rendering index are largely neglected.

Accordingly, it is the goal of the present invention to provide an illumination system that includes a color correction system such that the output of the lamps with spikes in their spectra, such as metal halide lamps and mercury lamps, be corrected to provide light output with the desired color temperature, chromaticity, and color rendering index ["CRI"] at low cost.

SUMMARY OF THE INVENTION

To achieve this goal, the present invention provides a fiber optic illuminator for use at a surgical area to provide sufficient light energy having the desired characteristics of white light in terms of color temperature, chromaticity, and CRI such that the critical features at the surgical site can be clearly viewed. The illuminator comprises a high efficiency arc lamp usually with spikes in the output spectrum and condensing and collecting systems for focusing the light emitted from the arc lamp onto an output bundle of output fibers. In between the arc lamp and the output fiber optic is an optical filtering system such that the output of the arc lamp will be modified to produce an output at the fiber optic with the desired characteristics.

BRIEF DESCRIPTION OF THE DRAWINGS

FIG. 9a is a graph showing the relationship of CRI to long wavelength notch reflectance;

DETAILED DESCRIPTION OF THE PREFERRED EMBODIMENTS

Figure 1:
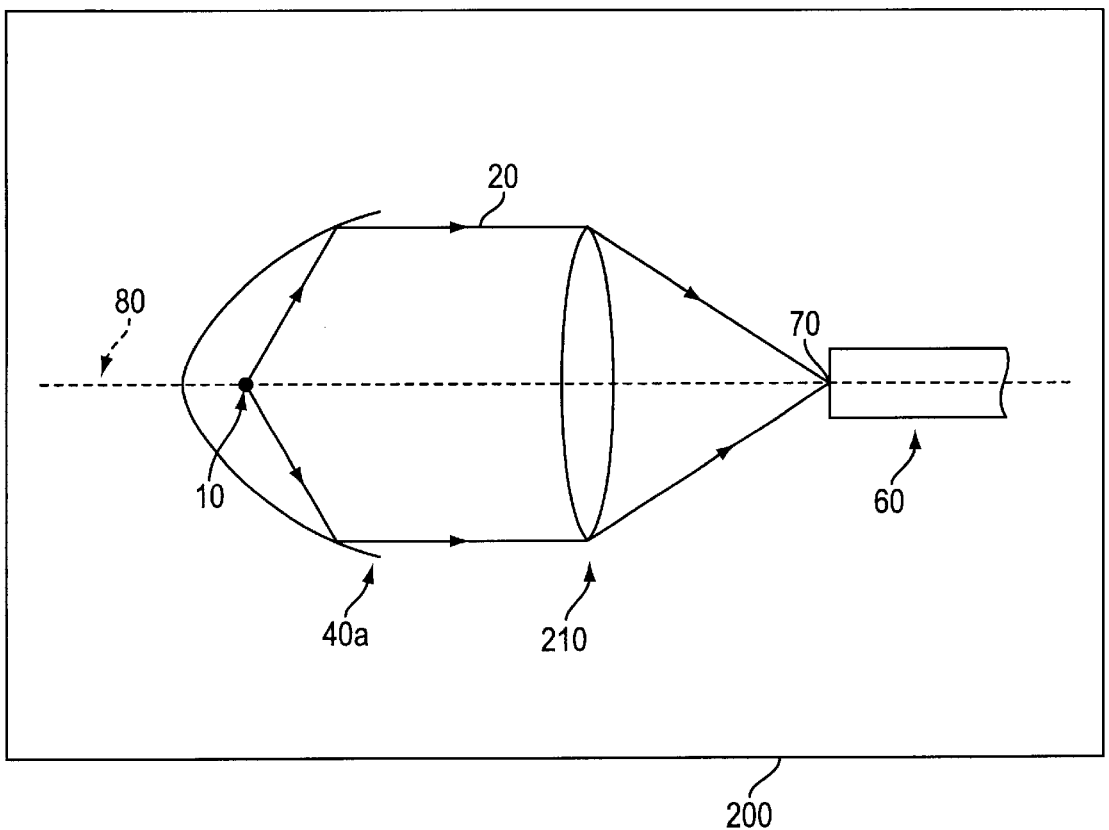
FIG. 1 (PRIOR ART) is a schematic diagram of a known fiber optic illuminator with a parabolic reflector.

FIG. 1 illustrates the internal components of a common fiber optic illuminator known in the prior art. The illustrated illuminator is an on-axis, parabolic reflector illumination system 200 that comprises a light source 10, a primary reflector 40a with a parabolic shape, a focusing lens 210, and an output fiber optic 60. Depending on the application, light source 10 may be chosen from a group of lamps that includes a xenon arc, mercury xenon arc, a metal halide arc, or a halogen lamp. In the illumination system 200, the emission area of the light source 10 is placed on the optical axis 80 at the focus of the parabolic reflector 40a, causing the output 20 to be collimated. The parabolic reflector 40a may be coated to preferentially reflect certain desired wavelengths. For example, in visible applications, a cold coating may be used to transmits UV and infrared radiation such that the reflector 40a directs only the visible portion of the spectrum as the output 20. The parallel output 20 is than focused into a smaller spot 70 by the focusing lens 210 onto the output fiber optic 60.

Figure 2:
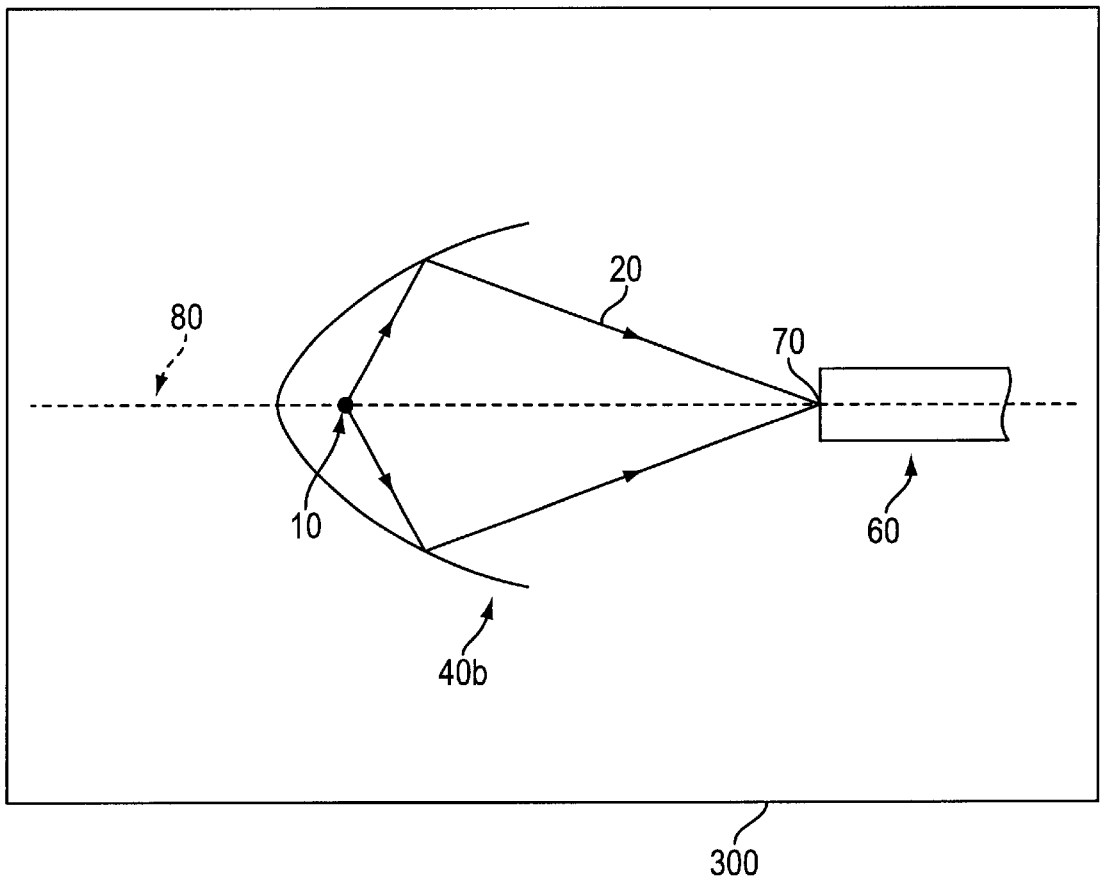
FIG. 2 (PRIOR ART) is a schematic diagram of a known fiber optic illuminator with a elliptical reflector.

FIG. 2 shows the configuration of an on-axis, elliptical reflector illumination system 300. The illumination system 300 uses an elliptical reflector 40b to direct optical output 20. The emission area of the lamp 10 is placed on the optical axis 80 at one focus of the elliptical reflector 40b and the output fiber optic 60 is placed on the optical axis 80 at the other focus of the elliptical reflector 40b. Depending on the applications, the surface of the elliptical reflector 40b can also be coated accordingly, as described above.

Both the known illumination systems 200 and 300 illustrated in FIGS. 1 and 2 have the common drawbacks that the magnification of the systems is larger than 1 and that the magnification changes with angle, thus reducing the brightness of the output focused spot 70.

Figure 3:
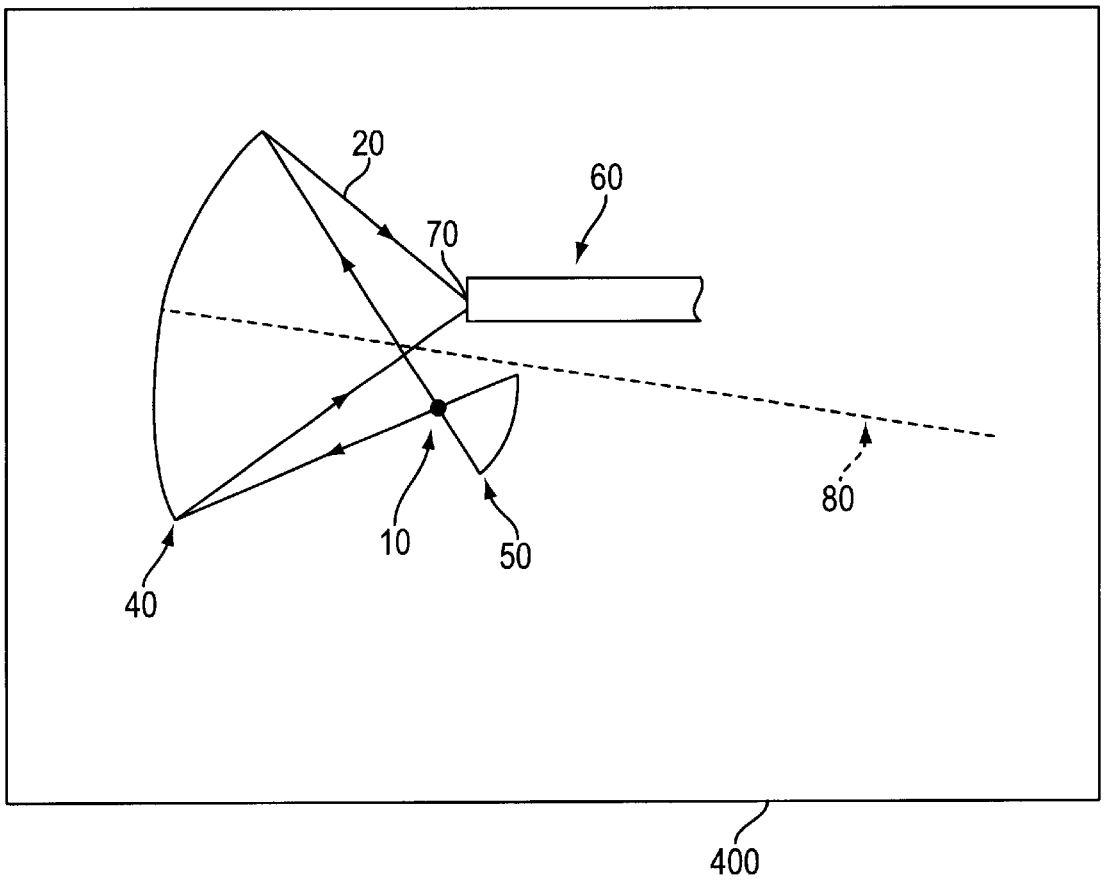
FIG. 3 (PRIOR ART) is a schematic diagram of a known fiber optic illuminator with an off-axis toroidal reflector.

FIG. 3 illustrates a known off-axis illumination system 400 in which the emission area is imaged onto the output fiber optic 60 by the primary reflector 40 with a magnification that is approximately 1 and is substantially constant over all angles, thus preserving the brightness of the output 20 at the focused output spot 70. Accordingly, the off-axis illumination system 400 has a higher output than previously described systems with the same lamp 10, especially at small etendue.

In the off-axis illumination system 400, the output 20 can be further increased by including a retro-reflector 50 as shown in FIG. 3. The retro-reflector 50 reflects the light emitted at the opposite side of the primary mirror 40 in the direction of the output 70. Similar to the reflectors in the on-axis illumination systems 200 and 300 described above, the reflectors 40 and 50 in the off-axis illumination system 400 may also be coated to selectively transmit and reflect specific radiation ranges.

Figure 4A:
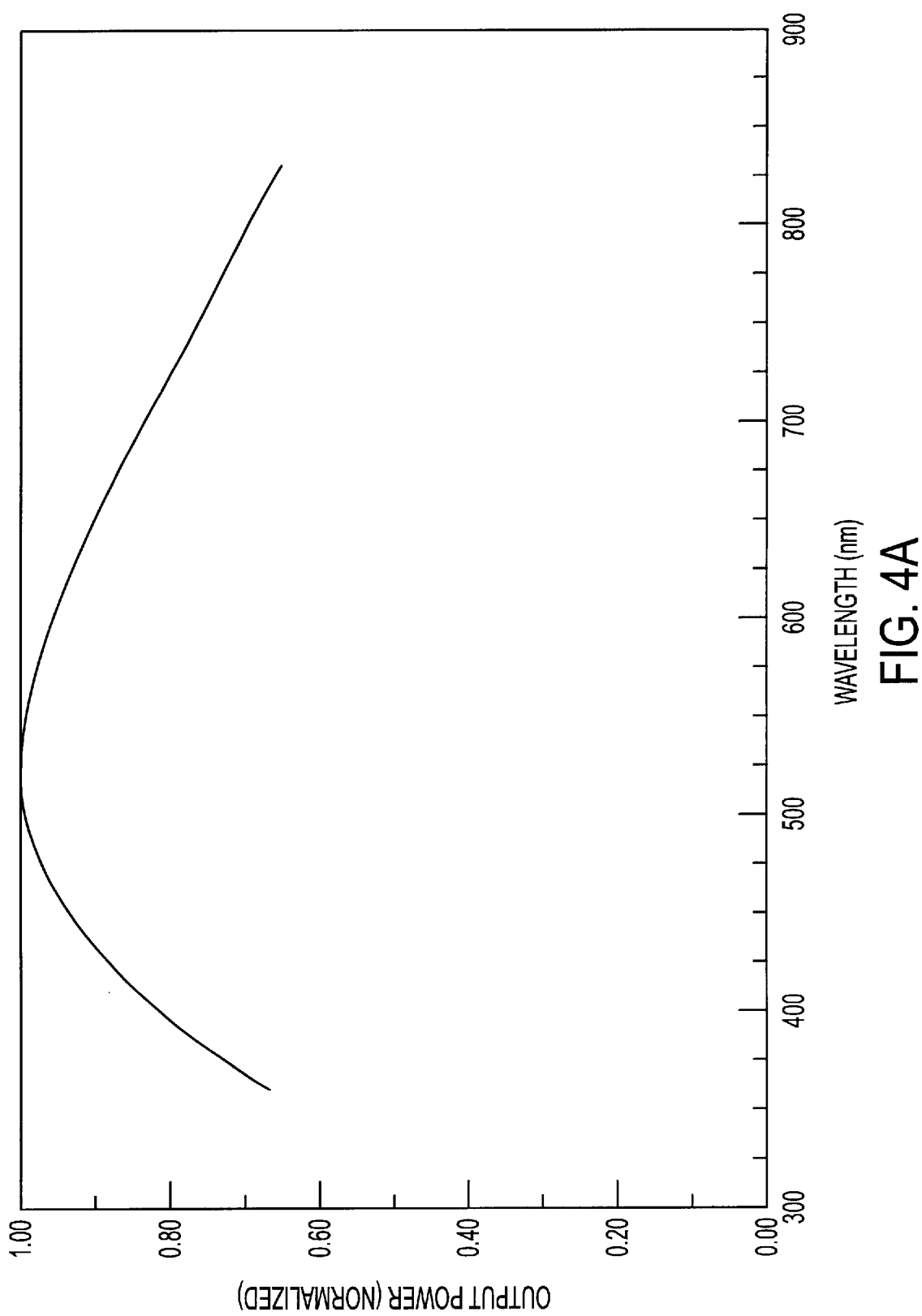
FIG. 4a is a diagram of the spectrum of a typical solar black body radiation with color temperature of 5500° K.

To understand the visual aspect of light, FIG. 4a shows the output spectrum of a typical black body radiation source with color temperature of 5500° K. The illustrated spectrum also represents the output measured from direct sunlight. Although the output radiation of the 5500° K. black body radiation source is not the same at all wavelengths, the color rendering index, the measure of how well a specific illumination preserves the original colors of a viewed object, is 100% by definition.

Figure 4B:
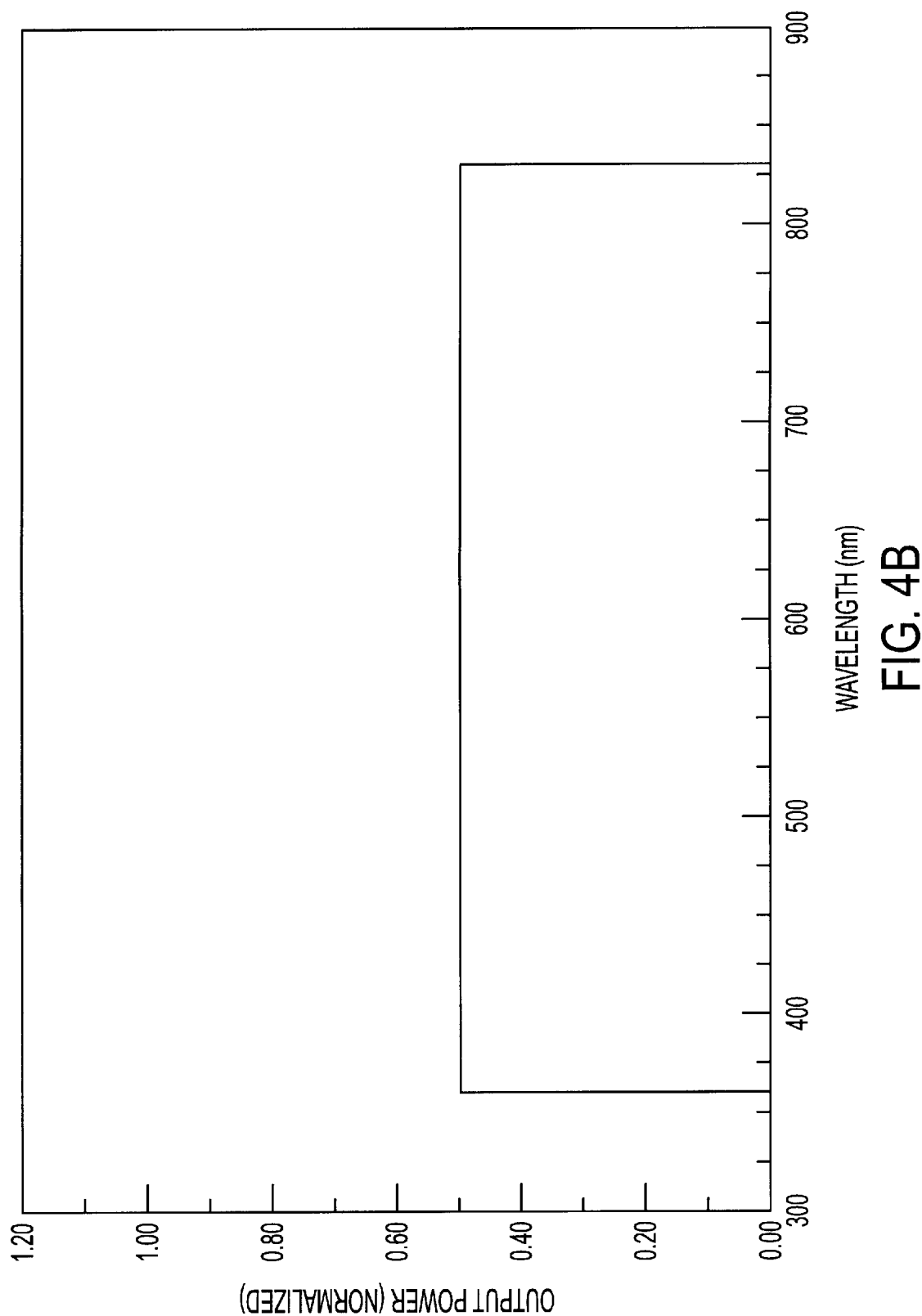
FIG. 4b is a diagram of the spectrum of a white light source with uniform output power.

FIG. 4b shows the output spectrum of white light in which the power is constant over the visible spectrum. The color temperature of the light source illustrated in FIG. 4b is calculated to be 5455° K. and color rendering index of 95.11%, which means that the color of the objects illuminated with such a light source will be slightly off compared to standard light source produced by the black body radiation of FIG. 4a. Illuminations within, and close to, these two points are considered to be good illuminations. In general, the various illuminations in this region have color temperature on the order of 5500° K. and CRI of over 85% and are practically indistinguishable from each other.

A common type of lamp 10 is the xenon arc lamp. It consists of a bulb with an anode and cathode filled with xenon gas at high pressure. When the lamp is ignited with a electric current through the gas, an arc is formed emitting radiation with output that is nearly uniform across the visible spectrum having good color temperature and color rendering index. The output of the xenon bulb is very close to those of white light or sunlight, with a color temperature of about 6200° K. and chromaticity coordinates of X=0.30, and Y=0.30, and CRI of approximately 0.93. Although the output characteristics of xenon lamps are very desirable in general, the disadvantages of using xenon lamps for illumination are the intrinsic low efficiency of the bulbs in converting electrical power into optical outputs and the relatively high costs of the lamps and the associated ballasts.

For higher efficiency and lower cost applications, metal halide lamps are usually used. To increase the efficiency of the lamps, a small amount of dopants, usually metal halides, mercury, sodium, etc. are introduced into the bulb. These small amounts of dopants provide additional transition energy levels in the emission process producing efficient electron quantum level transitions in the arc bulb to produce more light energy. The drawback to the doped bulbs is that the extra light introduces the spectral characteristics of these dopant transitions. In particular, the bulbs emit light energy concentrated at certain wavelengths that appears in the output as spikes in the spectrum.

Figure 5:
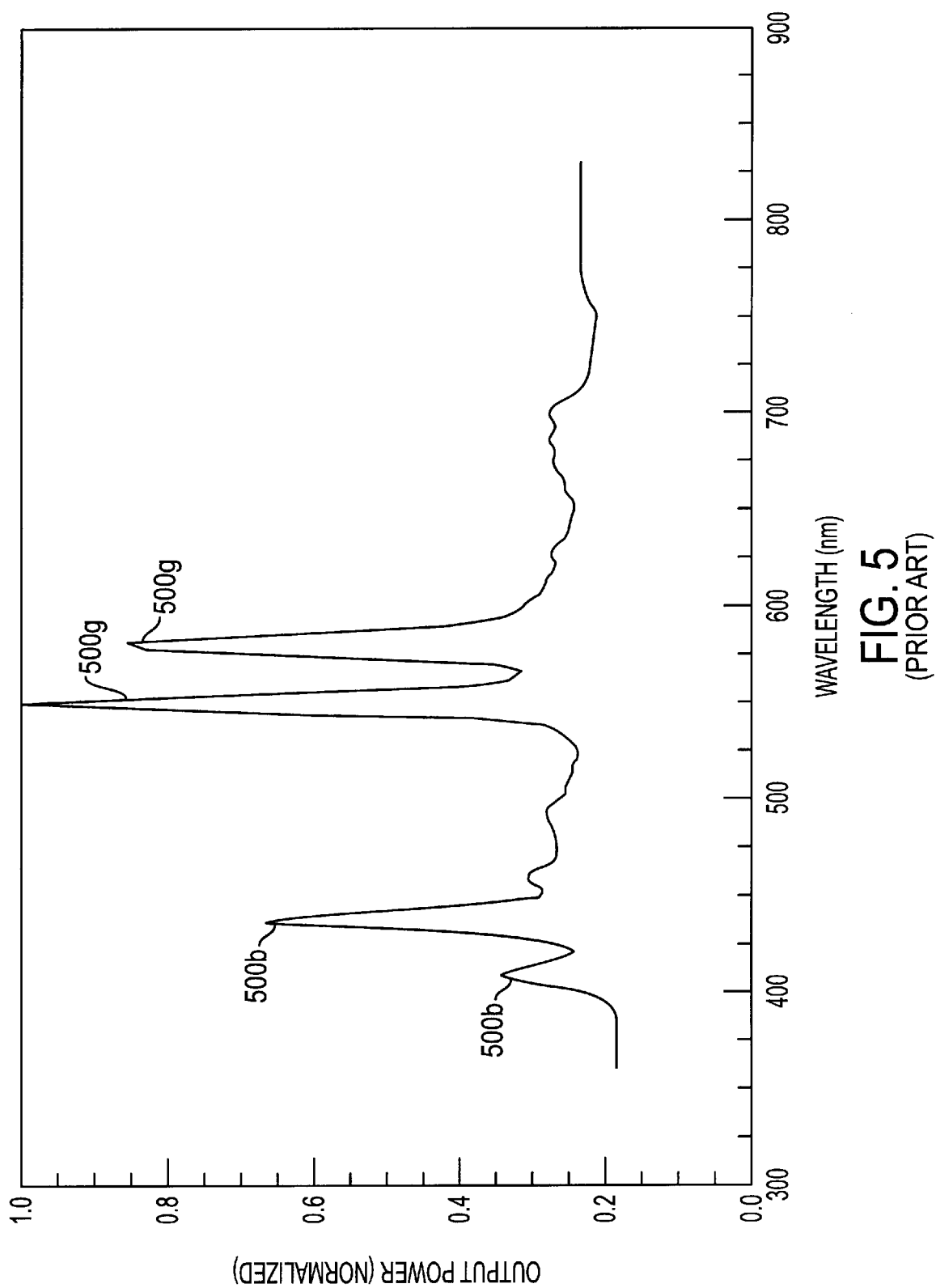
FIG. 5 (PRIOR ART) is a diagram of the output spectrum of a typical metal halide lamp.

An output spectrum of a typical metal halide bulb is shown in FIG. 5. The main difference between this spectrum and the spectrums of FIGS. 4a and 4b is the existence of spikes 500b and 500g. In the spectrum of FIG. 5, there are 2 spikes 500b in the blue region of the spectrum and 2 spikes 500g in the green region. The spikes are effectively extra light provided at the certain wavelengths and preferentially emphasize the corresponding colors to distort the original color content of illuminated objects. This color distortion alters the appearance an object. For example, during surgery on a patient, this illumination may cause reddish flesh tissue to appear bluish. The corresponding characteristics of such metal halide lamps usually have color temperature in the range of 5225° K., approximate chromaticity coordinates of X=0.34, and Y=0.36 shown in FIG. 8, and a CRI in the neighborhood of 68%.

To achieve optical output with sufficient light energy having the desired color temperature, chromaticity, and CRI at low cost, the present invention provides a illumination system 100 having a light source 10 filled with gas and dopants, a system for coupling light from the arc lamp into an output fiber optic, and an optical filter 30 placed between the arc lamp and the output fiber optic.

Figure 6:
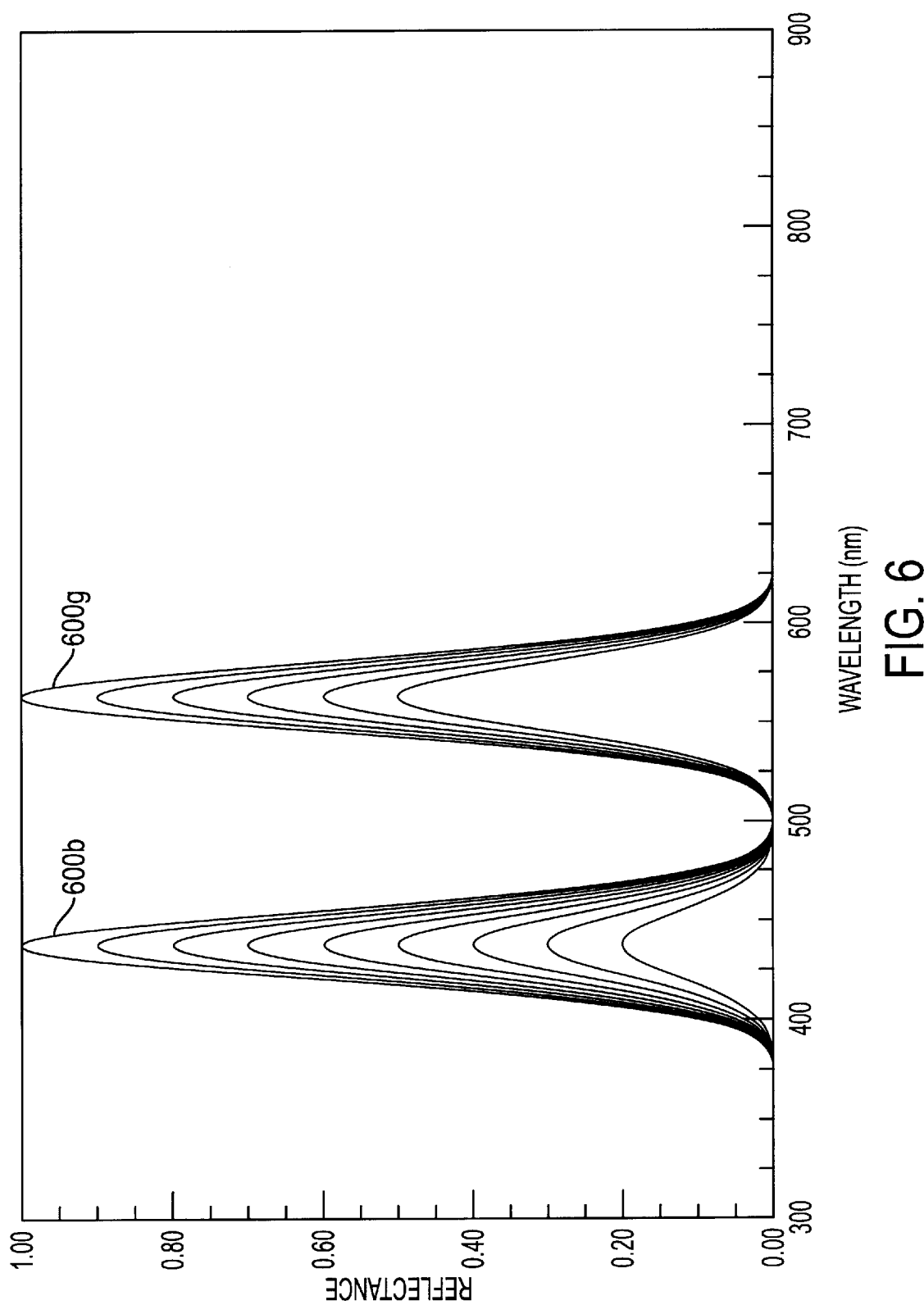
FIG. 6 is a diagram of the spectral transmittance of an optical filter in accordance with an embodiment of this invention.
Figure 7:
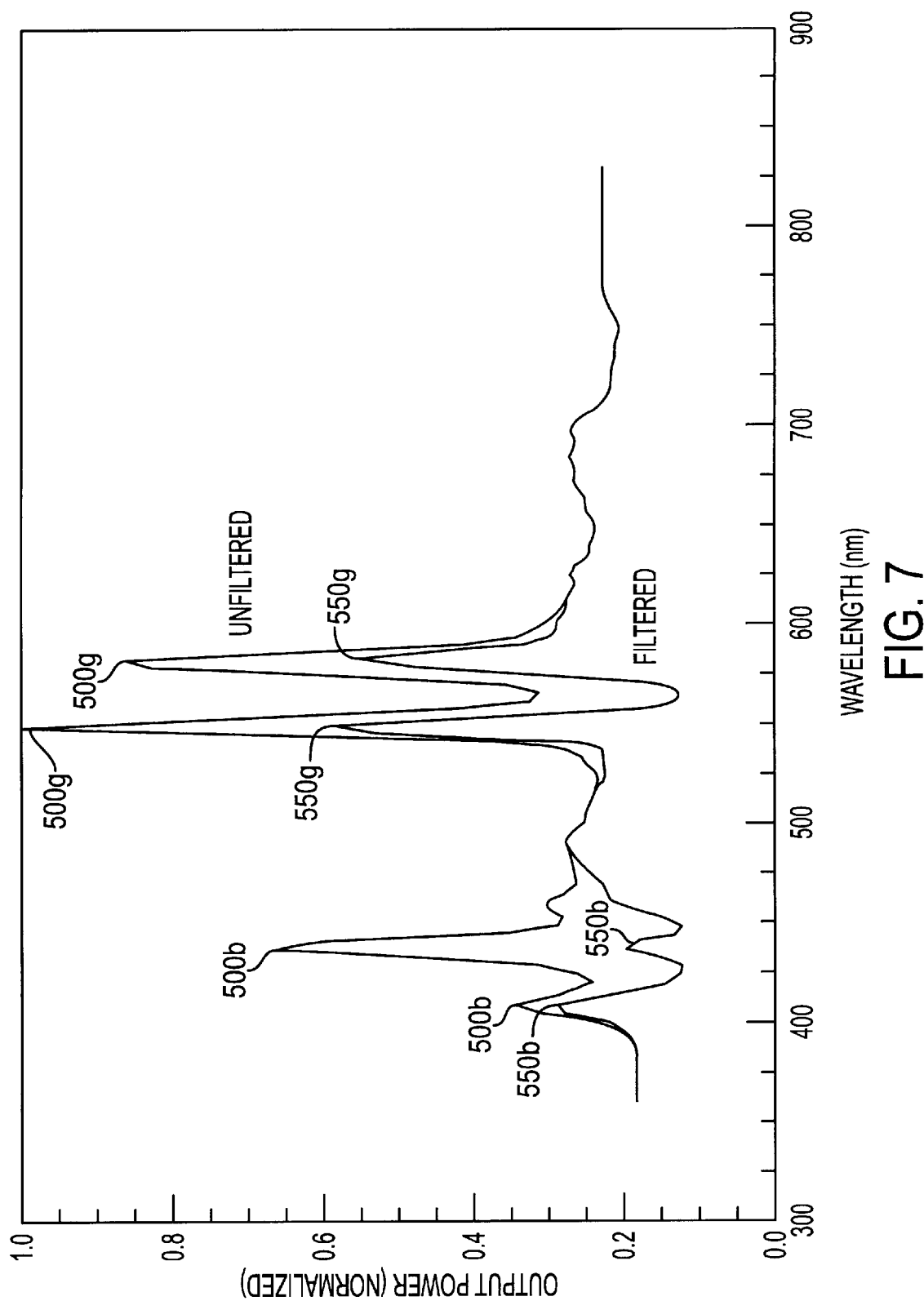
FIG. 7 is a diagram of the output spectrum of the metal halide lamp of FIG. 5 after filtering with the optical filter of FIG. 6.
Figure 8:
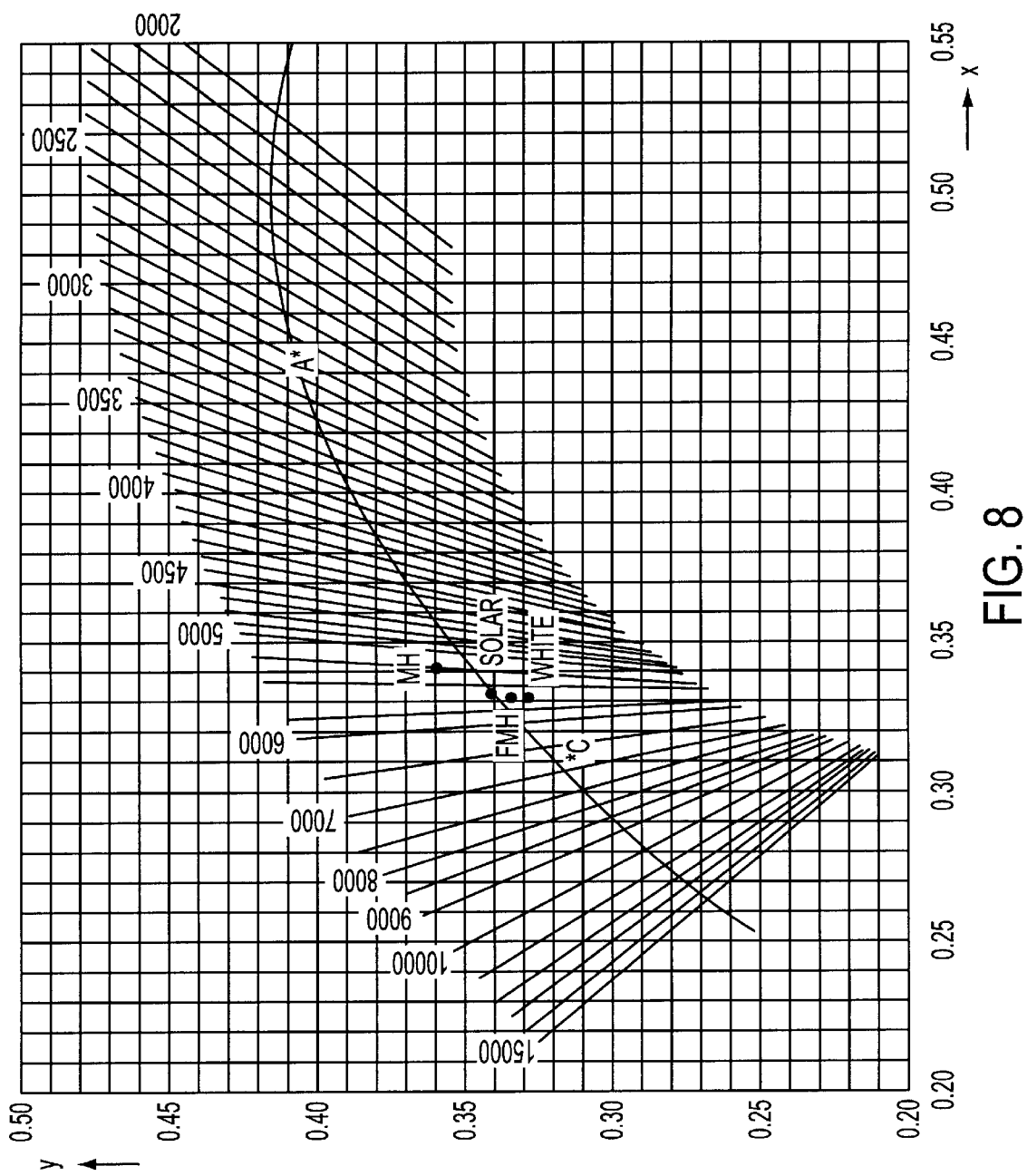
FIG. 8 is a graph showing the chromaticity coordinates and the correlated color temperatures showing coordinates of sunlight (SOLAR), white light (WHITE), metal halide lamp (MH), and metal halide lamp after filtering (FMH).

FIG. 6 illustrates the characteristics of an exemplary optical filter 30 used in an embodiment of the present invention. The filter is designed to transmits light at various wavelengths and to attenuate the light energy to modify the output of the spectrum of the lamp 10, as seen in attenuation peaks 600b and 600g that correspond to spikes 500b and 500g. The basic function of the filter 30 is to attenuate the excess power at the spikes 500b and 500g while maintaining a minimum change in the rest of the spectrum. The spectrum of output of the metal halide lamp of FIG. 5 after filtering is shown in FIG. 7, illustrating the reduction of the spikes 500b and 500g. In particular, post-filter spikes 550b and 550g are far smaller than original spikes 500b and 500g. FIG. 8 shows the chromaticity of the output of the lamp 10 before and after filtering. After filtering, the chromaticity is between the white light (WHITE) and black body radiation (SOLAR) points. The color rendering index as calculated from the spectrum of FIG. 7 is over 90%.

Figure 9B:
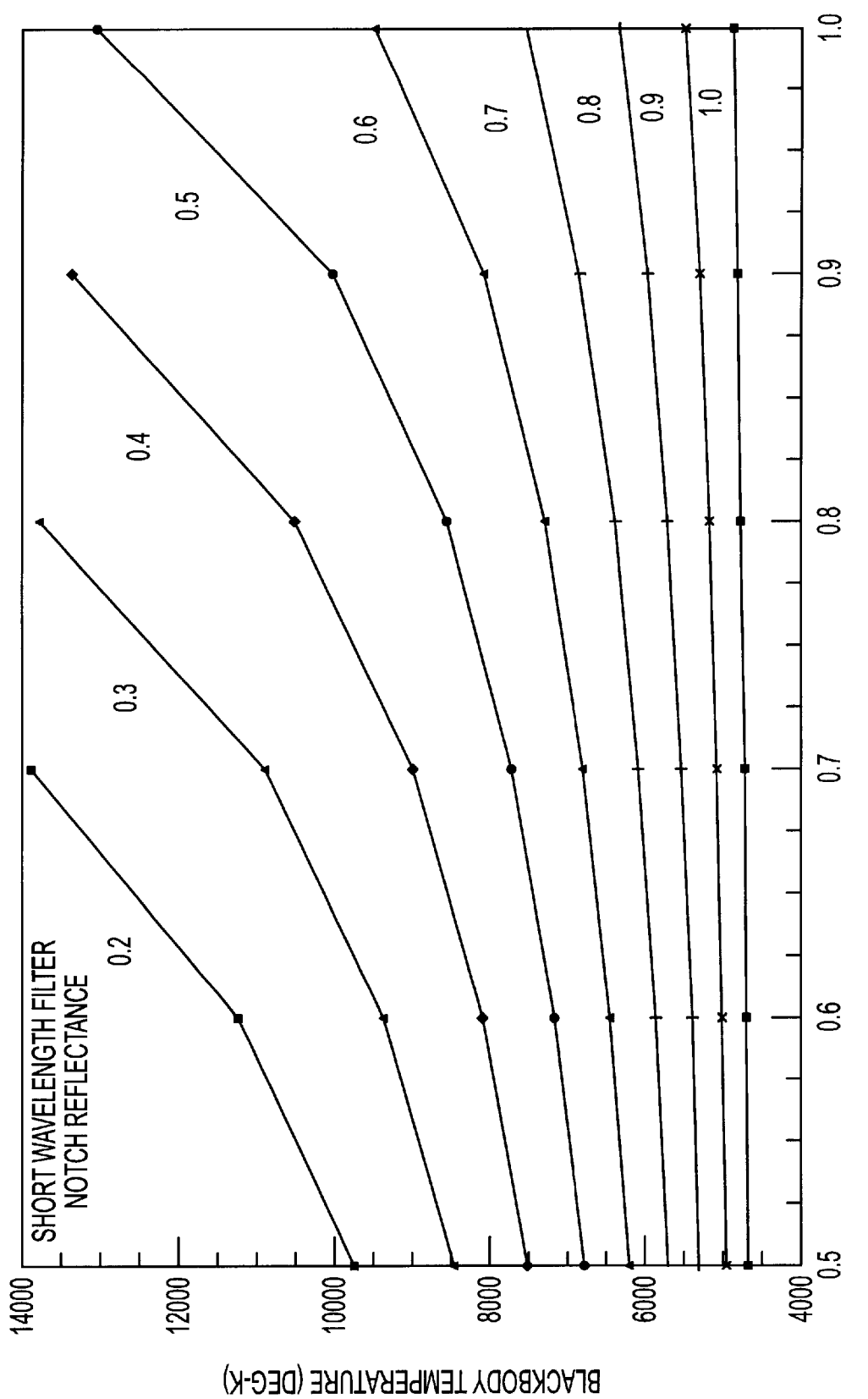
FIG. 9b is a graph showing the relationship of color temperature to long wavelength notch reflectance.

FIG. 9a shows the optimization of the CRI performed in the making of the filter by changing the amount of attenuation in the filter with respect to the filtering of the blue and green wavelength. FIG. 9b shows the optimization of the color temperature. From these optimizations, the desired attenuation curve of the filter can be determined, as shown in FIG. 6.

Figure 10:
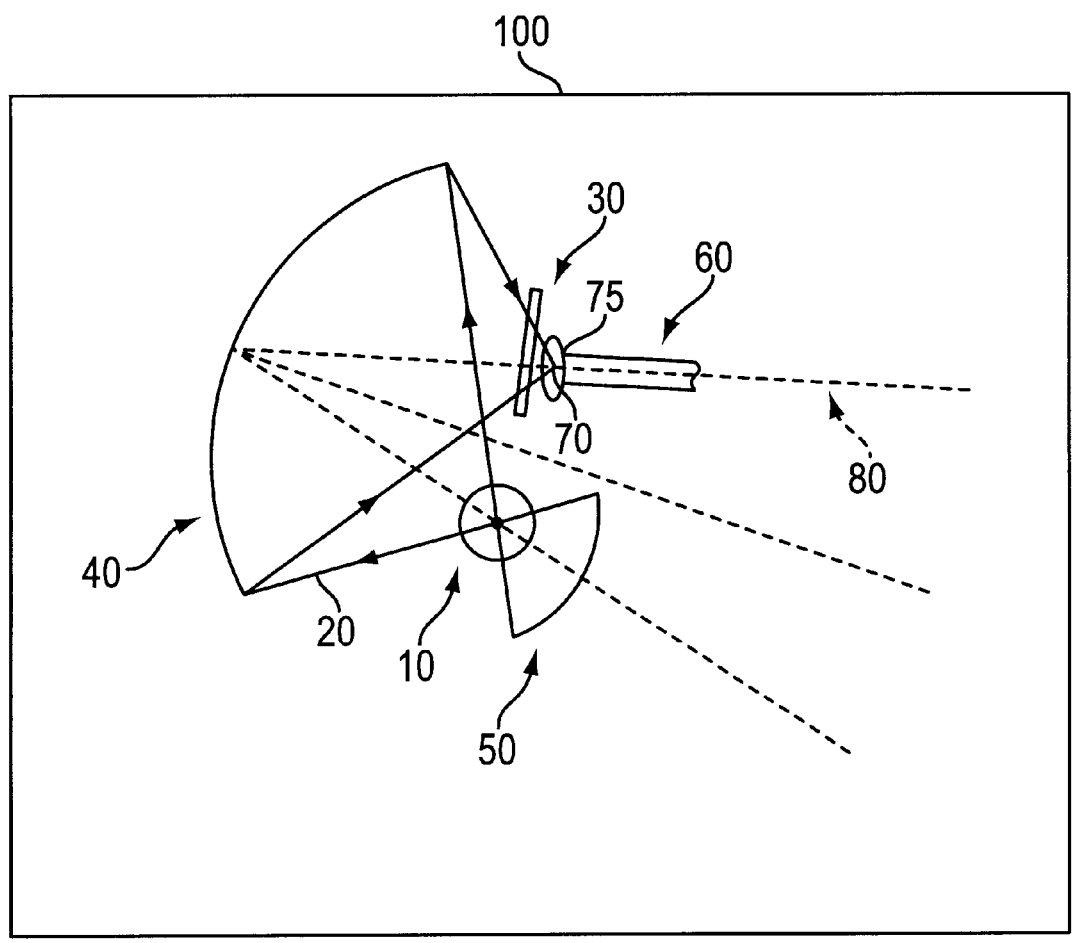
FIG. 10 is the schematic diagram of an off-axis illuminator with a flat optical filter in accordance with an embodiment of the present invention.

FIG. 10 illustrates the filtered illumination system 100 in a preferred embodiment of the present invention. This embodiment places the light source 10 off the optical axis 80. A short arc 270 W metal halide arc lamp may be used as the light source 10. The light source 10 is placed at one of the foci of the toroidal primary reflector 40 with the output focused spot 70 at the other focus. For increased output, the retro-reflector 50 may be placed near the lamp 10, at the opposite side of the primary reflector 40, such that more of the output light 20 from the light source 10 is directed toward the reflector 40. Between the output focused spot 70 and the primary reflector mirror 40, a filter 30 is used to modify the spectrum of the output 20 of the light source 10. At the output focused spot 70, a fused bundle may be used to couple the focused light 20 from the focused spot 70 to the output fiber optic 60. The fiber optic 60 used in this case is preferably a 1.5 mm plastic fiber with low melting temperature.

For filters 30 made with multi-layer dielectric coatings, the filtering characteristic is dependent on the angle of incidence, with gradual changes at small angles and rapid changes at larger angles. In one embodiment, the filter 30 has a multi-layer dielectric coating on top of a glass substrate. The change in the filtering characteristics with angle will show up in the output as non-uniform color that changes in the radial direction. The filtering response shifts to shorter wavelengths as incidence angle increases, known as "blue shift". The angular dependence is given approximately by $$\Delta\lambda/\lambda_0 = (\theta_i)^2/2(n^*)^2$$

where $\Delta\lambda$ is the change in wavelength, $\theta_i$ is the angle of incidence in radians, $n^*$ is the effective refractive index of the dielectric filter, and $\lambda_0$ is the peak response wavelength at 0 degree incidence. Wavelength shift is therefore a second order function of incidence angle and refractive index.

Figure 11:
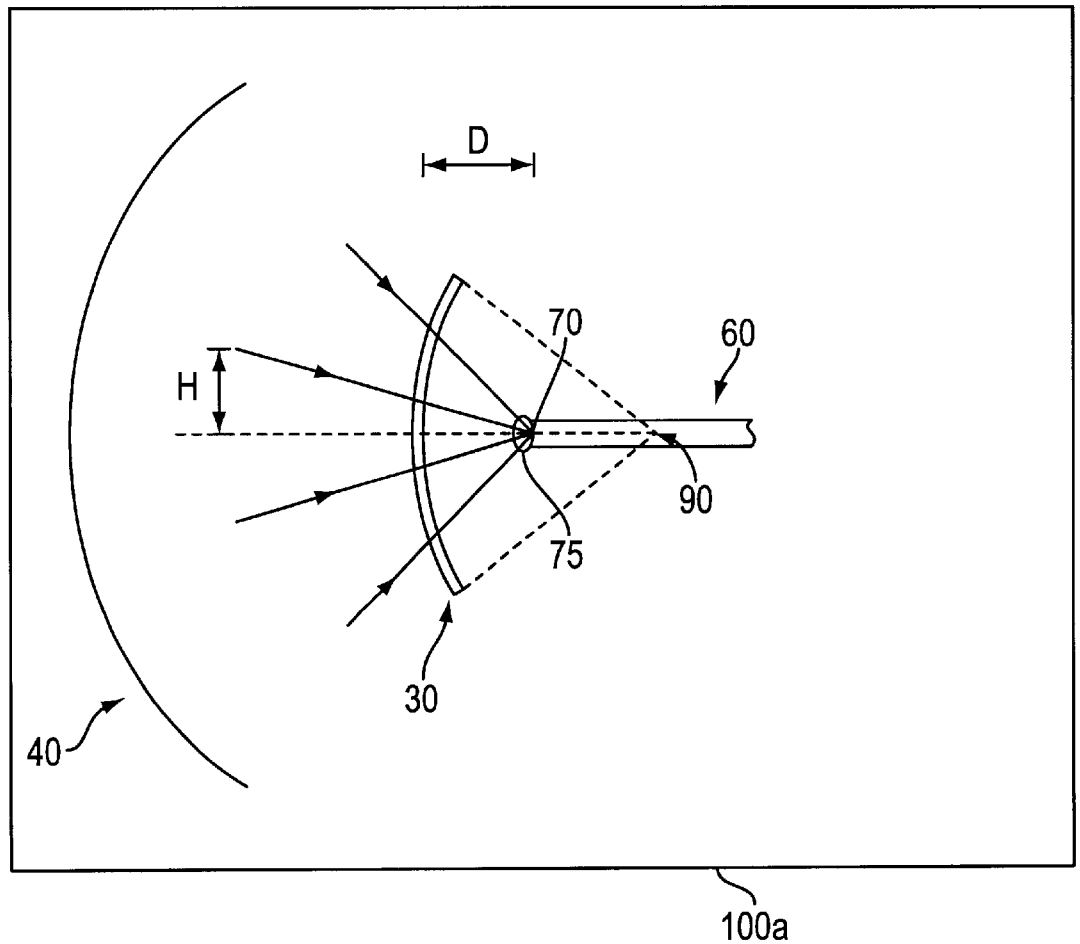
FIG. 11 is the schematic diagram of an off-axis illuminator with a curved filter in accordance with an embodiment of the present invention.

For a flat filter 30 at distance D from the focus, the $\theta^i$, angle of incidence on the filter is $$\theta_i = \arctan(H/D),$$

where H is the ray intercept height, as illustrated in FIG. 11.

In a converging light beam, the outer, high incidence angle rays are shifted in wavelength, resulting in color variations over the beam cross-section. A solution to this problem is the use of a curved filter 30a as shown in FIG. 11. FIG. 11 illustrates an alternative filtered illumination system 100a implementing a round optical filter 30a.

For a spherical curved substrate filter 30a with radius of curvature equal to D, angle of incidence is 0° at all ray intercept heights. Unfortunately, high numerical aperture converging beams require highly curved filters 30a to meet this condition, so that the center of curvature 90 of the curved filter 30a is generally not at the output focus spot 70. This makes uniform coating fabrication problematic, due to the steep coating angle of deposition. A more practical solution is to take advantage of the non-linear wavelength shift by trading off the angle compensation and coating deposition uniformity requirements. If a substrate of radius R>D is used, the variation of light incidence angle with ray height H is given by $$\theta_i = \arctan(H/(D\text{-SAG})) - \arcsin(H/R)$$

where $SAG = (R - (R^2 - H^2)^{1/2})$, such that the incidence angle for any given ray height H is reduced. By setting R close to D, but keeping arcsin(H/R)<30° for coating deposition, most of the wavelength shift can be eliminated.

Maximizing $n^*$ by selecting high index coating materials such as $TiO_2$ and $Ta_2O_5$ also serves to minimize the wavelength shift with angle. The use of such high index materials can reduce the effects of angle by as much as ⅓ or more.

For high power applications, a homogenizer 75 made of a fused fiber bundle, may be placed at the focused spot 70 in front of the output fiber optic 60. The fused fiber bundle can also be replaced by a round cladded rod. Depending on applications, a compound cladded rod, a rod with polygonal cross-section, and a compound cladded rod or fused bundle with polygonal cross-section can be used as the homogenizer 75 to homogenize the output intensity profile.

Further output improvements can also be made by tapering these components either from small input end to a larger output end, or vise versa. The tapering effectively changes the area to numerical aperture combination, thus allowing the designer to match the output of the focused light better to the particular fiber optic 60 thus increasing the total final output of the system.

In other applications, the output fiber optic 60 can be a fiber bundle or a large core fiber. Fiber bundles are commonly available in approximately 3 mm and 5 mm diameters. Fiber bundles of these sizes are used for general illuminations, surgical headlights, and endoscope illuminations. Large core fibers may range in diameter from approximately 3 mm up to about 18 mm in diameter. In smaller sizes, the large core fibers are used in illuminations similar to the fiber bundles. In larger sizes, the large core fibers are used in decorative lighting in which the light is diffused out from the side of the fiber along its length.

Although the embodiments described above consist of filters that is not part of the optical coupling system, the same filtering scheme can be implemented by coating the primary reflector with the appropriate dielectric layer that produces the same effects. In these cases, the filtering function are integrated with the coating in the parabolic reflector 40a in FIG. 1, elliptical reflector 40b in FIG. 2, and the primary mirror 40 in FIG. 3.

While it is illustrated and described in considerable detail herein, the invention is not to be limited to such details as have been set forth except as may be necessitated by the claims. The invention having been thus described, it will be apparent to those skilled in the art that the embodiments of the invention may be varied and modified in many ways without departing from the spirit and scope of the invention. Therefore, any and all such modifications are intended to be included within the scope of the following claims.

What is claimed is:

1. A fiber optic illumination system comprising:
   an arc lamp filled with gas and dopants, said arc lamp emitting visible light having a spectrum with spikes occurring at one or more wavelengths within the visible light spectrum which are characteristics of said dopants;
   an optical system for coupling light from said arc lamp into an output fiber optic system; and
   a filter apparatus placed between said arc lamp and said output fiber optic system, said filter apparatus being constructed and arranged to attenuate light energy at at least one of said one or more wavelengths such that said spectrum of said visible light emitted by said arc lamp is modified to provide a chromaticity and a color rendering index substantially equal to that of white light.

2. The fiber optic illumination system of claim 1 wherein said dopants are selected from a group consisting of metal halide and mercury.

3. The fiber optic illumination system of claim 1 wherein said gas is xenon.

4. The fiber optic illumination system of claim 1 wherein said optical system is an off-axis reflector system.

5. The fiber optic illumination system of claim 1 wherein said optical system is an on-axis reflector system.

6. The fiber optic illumination system of claim 1 wherein said output fiber optic system is a single fiber.

7. The fiber optic illumination system of claim 1 wherein said output fiber optic system is a fiber bundle.

8. The fiber optic illumination system of claim 1 wherein said filter apparatus consists of one or more filters such that said spikes in said spectrum are diminished.

9. The fiber optic illumination of claim 1 wherein said filter apparatus is a filter on a curved substrate.

10. The fiber optic illumination of claim 1 wherein said filter apparatus is a filter on a flat substrate.

11. The fiber optic illumination of claim 9 wherein said curved substrate has a radius of curvature greater than the distance between said substrate and said output fiber optic system.

12. The fiber optic illumination of claim 1 wherein said filter apparatus is part of said optical system for coupling.

13. The fiber optic illumination system of claim 1 wherein said chromaticity has coordinates substantially equal to X=0.33 and Y=0.33.

14. The fiber optic illumination system of claim 1 wherein said color rendering index is in the range between 0.85 and 1.00.

15. The fiber optic illumination system of claim 1 further comprises a homogenizer with an input end and an output end placed between said optical system and said output fiber optic system with said input end receiving light from said optical system and couples light into said output fiber optic system from said output end such that the intensity profile at said output end is more uniform than said input end.

16. The fiber optic illumination system of claim 15 wherein said homogenizer is chosen from a group consisting of a fused fiber bundle, a cladded rod, a tapered fused bundle, and a tapered cladded rod.

17. The fiber optic illumination system of claim 1, wherein:
said lamp is a metal halide arc lamp emitting light with spikes in its spectrum;
further comprising an output target, said output target including at least one fiber comprising said fiber optic system;
said optical system comprising an off-axis reflector system for coupling light from said metal halide arc lamp onto said output target, wherein said off-axis reflector system filters out substantially all UV and infrared radiations;
said filter apparatus comprising a filter placed between said off-axis reflector system and said output target such that said spikes in said spectrum of said metal halide arc lamp are diminished and the chromaticity of light at said output target has a value of X which ranges from about 0.30 to about 0.35, a value of Y ranges from about 0.30 to about 0.35, and a color rendering index ranges from about 0.85 to about 1.00.

18. The fiber optic illumination system in claim 17 wherein said filter has a multilayer dielectric coating on top of a glass substrate.

19. The fiber optic illumination system in claim 18 wherein said glass substrate is curved.

20. The fiber optic illumination system in claim 17 wherein said target is an output fiber optic.

21. The fiber optic illumination system in claim 17 wherein said target comprises a homogenizer and an output fiber optic.

22. The fiber optic illumination system in claim 21 wherein said homogenizer is chosen from a group consisting of a fused fiber bundle, a cladded rod, a tapered fused bundle, and a tapered cladded rod.

23. The fiber optic illumination system of claim 1, wherein:
said lamp is a metal halide arc lamp emitting light with spikes in its spectrum;
further comprising an output target, said output target including at least one fiber comprising said fiber optic system;
said optical system comprising a reflector system for coupling light from said metal halide arc lamp onto said output target, said reflector system filtering out substantially all UV and infrared radiations and said spikes in its spectrum such that chromaticity of light at said output target has a value of X which ranges from about 0.30 to about 0.35, a value of Y which ranges from about 0.30 to about 0.35, and a color rendering index ranges from about 0.85 to about 1.00.

24. The fiber optic illuminator system in claim 23 wherein said reflector system is an off-axis concave reflector.

25. The fiber optic illuminator system in claim 23 wherein said reflector system is an on-axis parabolic reflector.

26. The fiber optic illuminator system in claim 23 wherein said reflector system is an on-axis elliptical reflector.

27. A method of correcting color in a fiber optic illumination system according to claim 1, comprising:
providing an arc lamp filled with gas and dopants, said arc lamp emitting visible light having a spectrum with spikes occurring at one or more wavelengths within the visible light spectrum which are characteristic of said dopants;
providing an optical system for coupling light from said arc lamp into an output fiber optic system; and
providing a filter apparatus positioned between said arc lamp and said output fiber optic system, said filter apparatus being constructed and arranged to attenuate light energy at at least one of said one or more wavelengths such that said spectrum of said light emitted by said arc lamp is modified to provide a chromaticity and a color rendering index substantially equal to that of white light.

\* \* \* \* \*